Jan. 7, 1941. P. W. ADLER 2,227,528
CONDUIT SUPPORT
Filed June 1, 1938
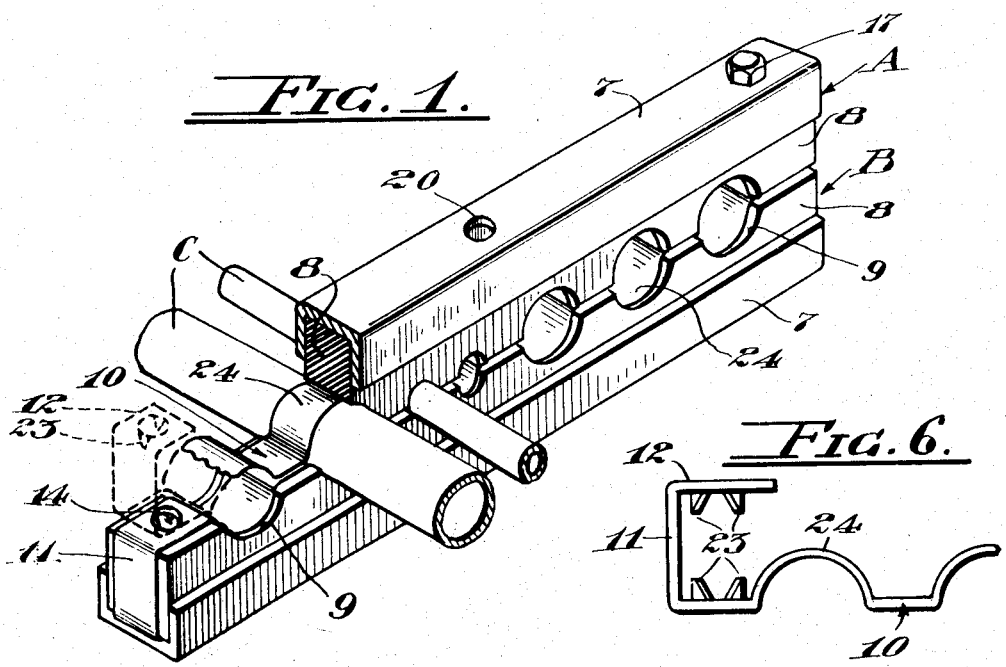
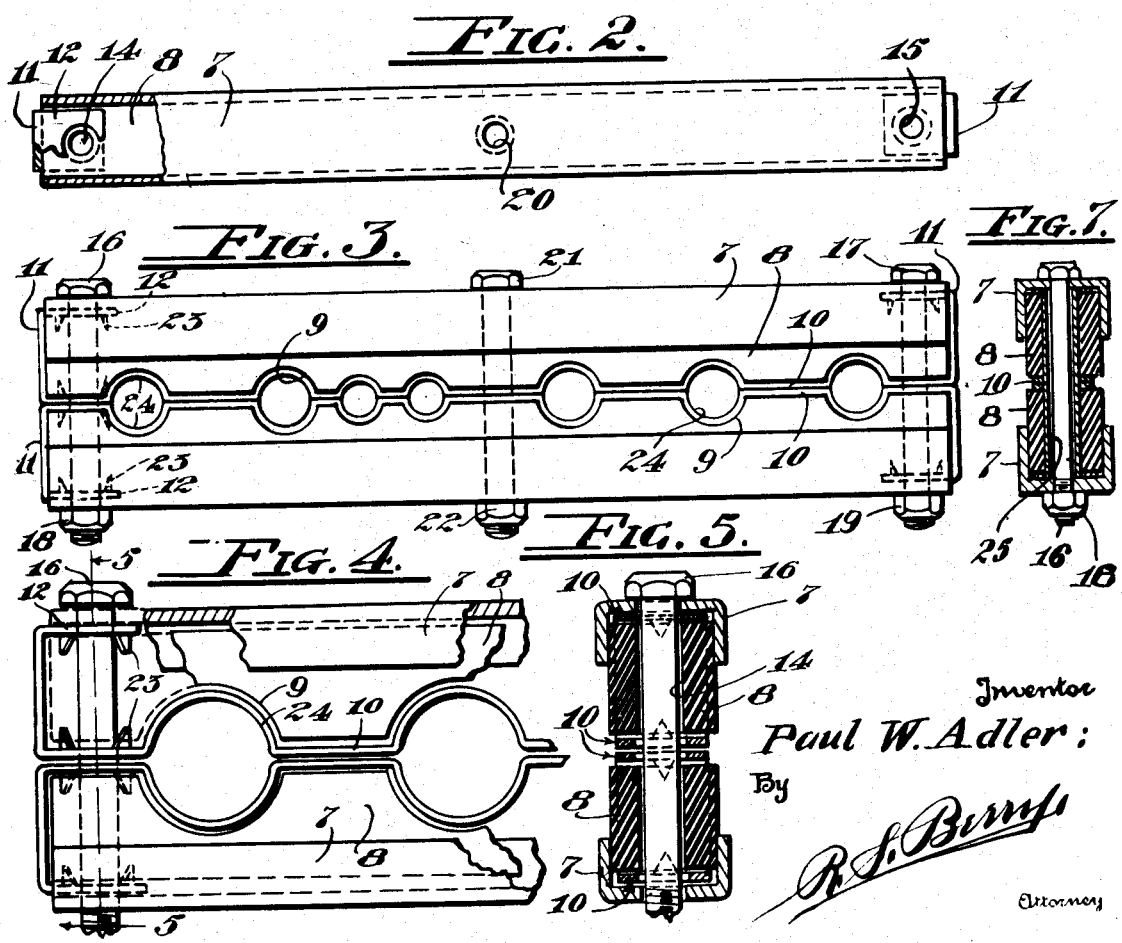
Inventor
Paul W. Adler;
By
Attorney Patented Jan. 7, 1941

2,227,528

UNITED STATES PATENT OFFICE 2,227,528

CONDUIT SUPPORT

Paul W. Adler, West Hollywood, Calif., assignor to Adel Precision Products Corporation, Burbank, Calif., a corporation of California Application June 1, 1938, Serial No. 211,161

13 Claims. (Cl. 174—135)

This invention relates to a support for conduits, tubing, piping and the like and has as its primary object the provision of a mounting which will serve to protect the lines carried thereby from damage due to vibrations and yet afford a positive dependable support for the lines and one which will afford adequate electrical grounding.

Another object is to provide a mounting which is especially applicable for use in supporting the lines and conduits employed in air craft and which is so constructed as to afford a substantial support for the lines and yet provide adequate insulation against excessive vibrations thereof and thus insure against line failure or leakage at fittings due to vibrations of the craft either by the motive power or the distortion vibrations of the structure.

Another object is to provide a mounting for air craft lines which while affording requisite support for the lines will permit limited movement and desired flexibility of the lines relative to the supporting structure to which the lines must be connected, and which mounting is so formed as to permit of its being adjusted and set to afford the correct degree of vibration damping on the lines according to the nature of the particular portion of the air craft structure on which the lines are carried.

Another object is to provide a flexible mounting for air craft lines embodying means for effecting adequate electrical grounding or bonding, both for prevention of fire and radio interference, which latter feature under present practice requires the employment of bonds at approximately eighteen inch intervals throughout the length of the air craft lines.

Another object is to provide a mounting for air craft lines which is compact and involves few parts and is adapted to be readily assembled in the limited space available, and which is especially applicable for use in crowded quarters where the use of conventional supports are either impossible or excessively expensive, cumbersome, and often unsafe.

Another object is to provide a line mounting or support of the above character which is so designed as to facilitate it being constructed to accommodate any required number of lines or conduits of various diameters, and which whether employed as a support for a single line or a plurality of lines either of corresponding or different sizes, adequate resiliency and electrical bonding will be afforded for each line or conduit carried thereby.

A further object is to provide a support of the type specified, which is sufficiently flexible to permit the installation of lines or conduits the shape of which deviates somewhat from the form for which the support was intended, and whereby the support is rendered specially serviceable in replacements since replacement lines or conduits are often at variance with the parts originally installed, and which feature also enables more expedient and economical manufacture of the support since the manufacturing tolerances may be increased and obviates the necessity of extreme accuracy in dimensioning of the support which is particularly advantageous in making up new parts of the support where the original tools and templets are not available.

With the foregoing objects in view, together with such other objects and advantages as may subsequently appear, the invention is carried into effect as illustrated by way of example in the accompanying drawing, in which:

Fig. 1 is a perspective view of the conduit support with portions broken away;

Fig. 2 is a plan view of the support partly in section;

Fig. 3 is a view of the support as seen in front elevation;

Fig. 4 is an enlarged detail in front elevation of an end portion of the support showing the parts thereof slightly separated relative to each other;

Fig. 5 is a view in section as seen on the line 5—5 of Fig. 4 showing the manner of assembling resilient blocks and associated static strips of the support;

Fig. 6 is a detail in elevation of an end portion of a static strip employed in the support; and Fig. 7 is a sectional view similar to Fig. 5 showing the manner of fitting the support with a spacer to limit the extent of compression of the resilient blocks.

Referring to the drawing more specifically A and B indicate separable complementary clamping members which constitute collectively the conduit support. Each of the clamping members A and B embodies a rigid back member 7 which is preferably formed of strong light metal of open ended channel construction as here shown, but which may be formed of any other suitable material and of such shape as to afford requisite strength. On each of the back members 7 is carried a resilient clamping jaw comprising a block 8 formed of rubber or rubber composition, or of a synthetic rubber such as "Neoprene." The blocks 8 while being resilient are of such rigidity as to offer considerable resistance to compression, which rigidity is augmented by reinforcing the back portion of the block longitudinally and transversely, as by means of the members 7.

In carrying out the invention the blocks 8 are formed at suitable intervals throughout the lengths thereof with transverse channels 9 of arcuate or other cross section substantially conformable to the contours of conduits C intended to be seated therein; the support being provided with whatever number of such conduit receiving channels 9 according to the number of conduits to be engaged by the blocks, and such channels being formed of whatever dimensions and contours as occasion may require according to the size and shape of the conduits to be engaged thereby.

Extending longitudinally over the channelled face of the block 8 and conforming to the contour thereof is a static strip 10 formed of a thin flat ribbon of sheet metal of high electrical conductivity. The end portions of the static strip 10 extend over the ends of the block 8 as indicated at 11 and the ends thereof are inturned as indicated at 12 to extend between the resilient block 8 and the back member 7 into electrical contact with the web of the latter.

Formed in the clamping members A and B adjacent to the ends thereof are openings 14 and 15 which pass through the connecting webs of the back members 7 and through the blocks 8 as well as through the overlying end portions of the static strips 10, which openings are designed to receive bolts 16 and 17 having threaded end portions on which are screwed nuts 18 and 19 as particularly shown in Fig. 3, which nuts, when tightened on the bolts 16 and 17, serve to clamp and securely fasten the clamping members A and B together.

Where the conduit support is of such length as to require intermediate connection between the clamping members A and B such clamping members are provided with one or more bolt receiving openings 20 to receive a bolt 21 fitted with a nut 22 as particularly shown in Fig. 3.

As a means for anchoring the static strip 10 to the resilient block 8, spurs 23 are formed on the adjacent faces of the overlying end portions of the static strip as particularly shown in Fig. 6, and which spurs are embedded in the contiguous faces of the resilient block 8 so as to securely hold the static strip against lateral shifting relative to the block 8. However, the static strip is adhered to the block either by an adhesive or by molding the block and strip together.

In the application and operation of the invention the clamping strips A and B are positioned astride a suitable number of conduits C with the latter positioned in the channels 9 and seating on arcuate lengths 24 of the static strips lining the recesses 9 as particularly shown in Fig. 1. On thus assembling the clamping members A and B in engagement with the conduits C the bolts 16, 17 and 21 are put in place and their respective nuts 18, 19 and 22 are tightened thereon to securely bind the clamping members A and B on opposite sides of the conduits; the nuts being tightened sufficiently to bring the static strips 10 of the clamping members A and B into close intimate contact with each other between the adjacent conduits C and at the same time place the resilient blocks 8 under a state of compression. The spurs 23 of the static strips keep them in place till said bolts are inserted.

It has been found in practice that it is desirable to regulate the extent of compression of the resilient block 8 according to whatever degree of elasticity or rigidity is found to be most desirable for a particular support; since in some instances it is advantageous and necessary to have the support sufficiently resilient as to permit movement of the conduits carried thereby relative thereto, and in some cases it is quite essential that the support offer considerable resistance to relative movement of the conduits. This variation may be readily effected as occasion may require by adjusting the nuts on the clamping bolts 16, 17 and 21 to place the resilient blocks under more or less compression between the back members 7; tightening of the nuts rendering the blocks more rigid and loosening of the bolts rendering the blocks more flexible or resilient. The reinforcement of the back portons of the individual blocks 8, as is afforded by the back member 7, serves to stiffen the block against excessive bending and facilitates positioning of the pair of the blocks in proper opposed parallel relation to each other on opposite sides of the conduits and also serves to limit flexing and spreading of the back portions of the block on imposing pressures thereon.

In order to definitely limit the amount of compression for the resilient blocks 8 for a specific installation, spacing tubes 25 are positioned in the portions of the openings 14, 15, and 20 extending through the resilient blocks and through the end portions of the static strips so as to seat at their ends on the inner faces of the back members 7 and act as stops to limit the movement of the back members of a support toward each other. The bolts 16, 17 and 21 are passed through the spacing tubes as illustrated in Fig. 7 and on applying the nuts on the bolts the clamp members may be drawn toward each other until the back members 7 seat against the ends of the tubes 25 thereby definitely limiting the extent of compression of the resilient blocks. In order to permit compression of the resilient blocks between the back members, the spacing tubes 25 are necessarily of a length shorter than the combined thicknesses of the blocks and static strips whereby when the nuts are tightened on the bolts sufficiently to bring the static strips in face to face contact, continued tightening of the nuts may be effected to draw the back members 7 against the end of the tubes and thus effect compression of the blocks. Tubes 25 are to be supplied in various lengths to meet varying requirements.

I claim:

1. In a conduit support a pair of clamping members for positioning on opposed sides of a plurality of conduits; each of said members embodying a rigid back member, a resilient block seated on the back member and having a portion thereof projecting therefrom formed with transverse conduit receiving channels, a static strip extending longitudinally of the channelled face of said block having its ends terminating between said block and said back member; and means for fastening said clamping members together including screw means for placing said resilient blocks under a state of compression, the end portions of said static strip having spurs embedded in the outer face of said resilient block to hold said strips in place during assembling of the structure.

2. In a conduit support, a pair of elongated rigid back members, a resilient block carried on each of said members and protruding therefrom having conduit receiving channels extending transversely of the protruded face thereof, a metallic strip overlying the channelled face of each of said resilient blocks having end portions overlying the ends of the block and extending between the underside of the block and the web of the contiguous back member, each end portion of said strip being in electrical contact with said web, and bolts passing through the end portions of said back members, resilient blocks and metallic strip for binding said elements together and for placing said blocks under a state of compression.

3. In a conduit support, a pair of elongated resilient blocks adapted to be positioned face to face on opposite sides of conduits to be supported thereby, said blocks being formed on their contiguous faces with transverse conduit receiving channels arranged with the channels on one of said blocks registering with the channels on the other of said blocks, metallic strips extending longitudinally of said blocks on the contiguous faces thereof, and conforming thereto, and adjustable means for clamping said blocks together under compression with said strips interposed therebetween, said means including elongated channel members, the channels of which contain outer portions of said blocks.

4. In a conduit support, a pair of resilient blocks adapted to be disposed face to face on opposite sides of conduits to be supported thereby, said blocks being formed with opposed transverse channels on the contiguous faces thereof, a pliable metallic strip extending longitudinally of each of said blocks on the channeled face thereof and conforming thereto, and adjustable means for clamping said blocks together under compression, said means engaging end portions of said metallic strips.

5. In a conduit support, a pair of resilient blocks adapted to be disposed face to face on opposite sides of conduits to be supported thereby, said blocks being formed with opposed transverse channels on the contiguous faces thereof, a pliable metallic strip extending longitudinally of each of said blocks on the channelled face thereof and conforming thereto, and adjustable means for clamping said blocks together under compression, said means passing through said blocks and through the end portions of said strip.

6. In a conduit support, a pair of resilient blocks adapted to be disposed face to face on opposite sides of conduits to be supported thereby, said blocks being formed with opposed transverse channels on the contiguous faces thereof, a pliable metallic strip extending longitudinally of each of said blocks on the channeled face thereof and conforming thereto, adjustable means for clamping said blocks together under compression, said means passing through said blocks and through end portions of said strip, and means on said strips penetrating adjacent faces of said blocks for retaining said strips against displacement relative to said blocks during assembling of the structure.

7. A conduit support comprising a pair of electrically conducting elongated rigid back members of channel cross section, a resilient block on each of said back members adapted to be disposed face to face on opposite sides of conduits to be supported thereby, said blocks being formed with opposed transverse channels on their adjacent faces, static strips interposed between the channelled faces of said blocks and electrically connected to said back members, spacing tubes extending between said back members through said blocks and static strips for limiting compression of the blocks, and means passing through said tubes for clamping said back members and blocks together.

8. In a conduit support, a pair of blocks formed of resilient insulating material adapted to be disposed face to face on opposite sides of metallic conduits to be supported thereby, said blocks being formed with opposed transverse channels on the contiguous faces thereof to receive the conduits, a pliable electrically conductive strip extending longitudinally between said blocks and conforming to the channeled face of at least one of said blocks and adapted to contact conduits supported between said blocks in said channels, means for clamping said blocks together, and means for grounding said strip to prevent accumulation of static electricity.

9. The structure called for in claim 8 including reinforcements for said blocks extending along the back portions thereof for stiffening said blocks longitudinally and transversely thereof.

10. In a conduit support, a block formed of resilient insulating material and having transverse conduit receiving channels on an edge thereof, a pliable electrically conductive strip carried by said block and arranged to effect electrical connection between conduits disposed in said channels, a metallic support for said block, means for clamping said block against conduits in said channels including said support; said strip being electrically connected to said metallic support to ground the conduits therethrough.

11. In a conduit support, a pair of elongated resilient blocks adapted to be disposed face to face on opposite sides of conduits to be supported by them and having transverse conduit receiving channels on their adjacent faces, metallic clamping members positioned on opposite sides of said pair of resilient blocks, and an electrically grounded conductive strip carried by at least one of said blocks and extending over and between said channels to provide an electrical connection between metallic conduits gripped between said blocks to prevent accumulation of static electricity in said conduits.

12. The subject matter of claim 11, in which said electrically conductive strip is in electrical contact with at least one of said metallic clamping members.

13. In a conduit support, a block formed of resilient material and having transverse conduit receiving channels on an edge thereof, an electrically conductive strip carried by said block, a metallic support for said block, means for clamping said block against conduits in said channels including said support; said strip being electrically connected to said metallic support and extending over and between the conduit receiving channels in contact with conduits therein to ground said conduits.

PAUL W. ADLER.